United States Patent
Drouart et al.

(10) Patent No.: US 6,269,663 B1
(45) Date of Patent: Aug. 7, 2001

(54) METHOD OF PURIFYING SILICA AND DEPOSITING ON AN OPTICAL FIBER PREFORM

(75) Inventors: Alain Drouart, Nanterre; Benoit Gouez, Acheres; Yves Lumineau, Herblay; Pierre Ripoche, Pithiviers; Jean-Florent Campion, Bois Colombes, all of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/137,141

(22) Filed: Aug. 20, 1998

Related U.S. Application Data

(63) Continuation-in-part of application No. 09/035,146, filed on Mar. 5, 1998.

(30) Foreign Application Priority Data

Aug. 17, 1998 (FR) .................................................. 98 10 464

(51) Int. Cl.[7] .................................................. C03B 37/18
(52) U.S. Cl. .................................. 65/391; 65/397; 65/17.4; 65/30.1; 65/452; 65/446; 427/446; 427/452
(58) Field of Search ........................... 65/391, 397, 422, 65/426, 17.4, 30.1; 427/452, 446

(56) References Cited

U.S. PATENT DOCUMENTS

| | | | |
|---|---|---|---|
| 3,128,166 | * | 4/1964 | Mohn ........................................ 65/18 |
| 3,361,525 | | 1/1968 | Rycke et al. . |
| 4,145,187 | | 3/1979 | Oliver et al. . |
| 4,221,825 | * | 9/1980 | Guerder et al. ........................ 427/34 |
| 4,265,649 | | 5/1981 | Achener ................................... 65/18 |
| 4,402,720 | | 9/1983 | Edahiro et al. . |
| 4,406,680 | * | 9/1983 | Edahiro et al. ........................ 65/32 |
| 4,610,708 | * | 9/1986 | Sarhangi et al. ....................... 65/32 |
| 4,983,370 | | 1/1991 | Loritsch et al. . |
| 5,152,819 | * | 10/1992 | Blackwell et al. ..................... 65/900 |
| 5,474,589 | * | 12/1995 | Ohga et al. ............................ 65/397 |
| 5,522,007 | * | 5/1996 | Drouart et al. ........................ 65/391 |

FOREIGN PATENT DOCUMENTS

| | | |
|---|---|---|
| 32 06 180 | 8/1983 | (DE) . |
| 34 34 598 A1 | 3/1986 | (DE) . |
| 0 360 479 A2 | 3/1990 | (EP) . |
| 2 446 264 | 8/1980 | (FR) . |
| 0 578 553 | 1/1994 | (FR) . |
| 0 658 520 | 6/1995 | (FR) . |
| 0 863 108 | 9/1998 | (FR) . |
| 2 134 896 | 8/1984 | (GB) . |

OTHER PUBLICATIONS

M. Carratt and S. Walker, "MCVD–Plasma Process for Manufacturing Single–mode Optical Fibers for Terrestrial Applications", Electrical Communication, 1st Quarter 1994, pp. 11–14.

* cited by examiner

Primary Examiner—James Derrington
(74) Attorney, Agent, or Firm—Sughrue, Mion, Zinn, Macpeak & Seas, PLLC

(57) ABSTRACT

The deposit of natural or synthetic silica comprises a preform (1) set into rotation (7) in front of a plasma torch (3) which moves back and forth substantially parallel to a longitudinal direction (L) of the preform (1), a feed duct (9) for feeding the plasma with grains of natural or synthetic silica (11), characterized in that the same feed duct (9) feeds the plasma with a fluorine or chlorine compound, preferably a fluorine compound, mixed with a carrier gas (15).

Sodium or lithium contained in the grains of natural or synthetic silica reacts with the fluorine or chlorine of the fluorine or chlorine compound, making it possible to improve the optical quality of fibers built up with the natural or synthetic silica at reduced cost.

8 Claims, 2 Drawing Sheets

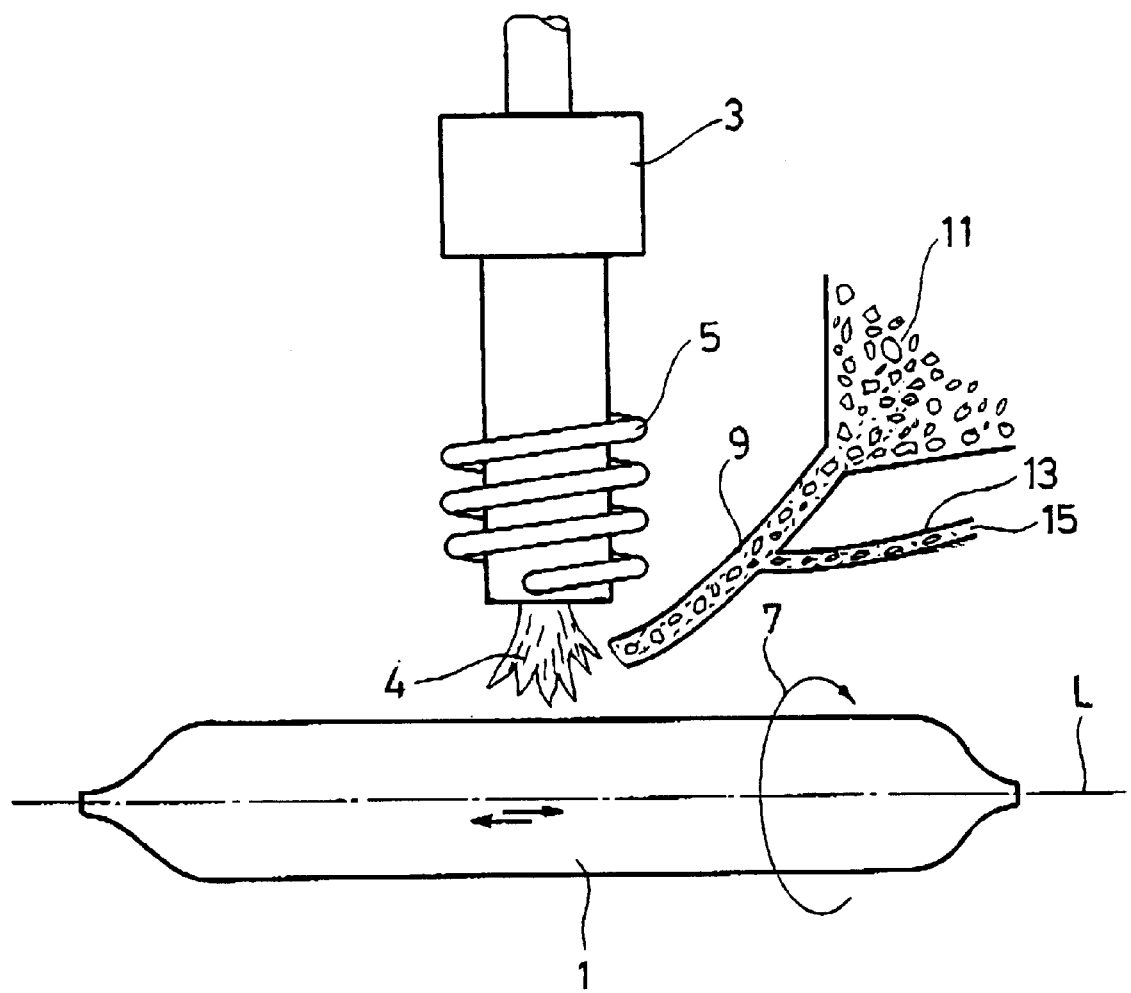

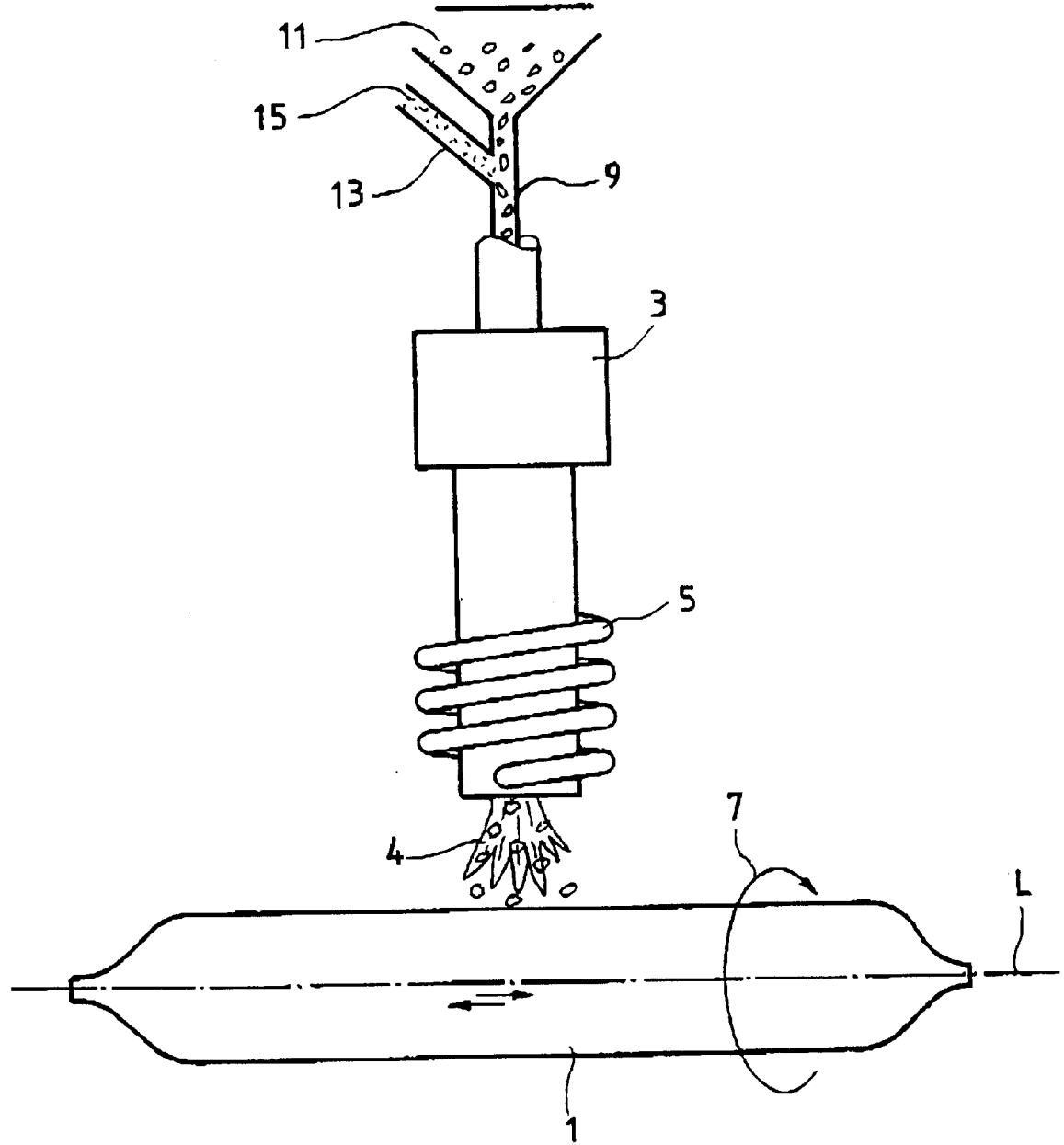

METHOD OF PURIFYING SILICA AND DEPOSITING ON AN OPTICAL FIBER PREFORM

This application is a continuation-in-part of U.S. application Ser. No. 09/035,146 filed on Mar. 5, 1998.

The invention relates to a method of purifying natural or synthetic silica, and to applying said method to depositing purified natural or synthetic silica on an optical fiber preform, in which a substantially cylindrical preform that extends in a longitudinal direction is set into rotation about its axis in front of a plasma or a flame which moves back and forth substantially parallel to the longitudinal direction of the preform, and in which a single feed duct feeds grains of natural or synthetic silica to the plasma or the flame.

In known manner, a preform is obtained by chemical vapor deposition implemented inside a tube mounted on a glassmaker's lathe, and which is subjected to a collapsing operation to form a solid form.

For multimode fibers, that way of making preforms suffices. However, for monomode fibers it is advantageous to add material, generally natural or synthetic silica, to the preform in order to increase its diameter and thus obtain, during fiber drawing, a continuous fiber that is several tens of kilometers long.

Material is added to the preform by means of a plasma torch. The preform is cylindrical in shape and it is set into rotation about its axis in front of the torch whose plasma is fed with grains of silica. The grains are melted and then deposited and vitrified on the preform. A plurality of passes are performed to build up to the desired diameter.

Depositing natural or synthetic silica suffers from a major drawback. Alkali elements such as sodium or lithium are present in non-negligible proportions in this type of material, and they are present in the deposited grains, thereby encouraging the formation of bonds between the OH group and the dopant elements, such as germanium (Ge). Such bonds are absorbent at certain wavelengths, thereby increasing the attenuation losses of the optical fiber at said wavelengths.

One aim of the invention is to provide a method of purifying natural or synthetic silica.

To this end, the invention provides a method of purifying natural or synthetic silica in which a plasma or a flame from heat energy supply means is fed by a feed duct with grains of natural or synthetic silica, characterized in that the same feed duct feeds the plasma or flame with a fluorine or chlorine compound (preferably a fluorine compound) mixed with a carrier gas and the feed conditions of said duct are adjusted to cause alkali or alkaline-earth elements contained in the natural or synthetic silica grains to react with the fluorine or the chlorine (preferably the fluorine) of the fluorine or chlorine compound (preferably a fluorine compound).

One aim of the invention is also to apply the method of purifying natural or synthetic silica to depositing natural or synthetic silica on an optical fiber preform, the deposit containing only a very small quantity of alkali or alkaline-earth elements.

To this end, the invention also provides a method of depositing natural or synthetic silica on an optical fiber preform in which a substantially cylindrical preform extending in a longitudinal direction is set into rotation about its axis in front of the plasma or flame coming from heat energy supply means which move back and forth substantially parallel to the longitudinal direction of the preform and in which a feed duct feeds the plasma or the flame with grains of natural or synthetic silica, characterized in that the same feed duct feeds the plasma or flame with a fluorine or chlorine compound (preferably a fluorine compound) mixed with a carrier gas, the feed conditions of said duct being adjusted to cause alkali or alkaline-earth elements contained in the grains of natural or synthetic silica to react with the fluorine or the chlorine (preferably the fluorine) of the fluorine or chlorine compound (preferably a fluorine compound). Said duct can be internal, upstream of the plasma flame envelope, or external to the heat energy supply means, in the plasma flame envelope at the torch outlet.

The plasma or flame is the seat of a chemical reaction in which the molten silica grains react with the fluorine or chlorine compound of the carrier gas. Advantageously, the temperature of the plasma can be adjusted to obtain high efficiency in the reaction, given the feed rates of the ducts feeding the carrier gas and for feeding the natural or synthetic silica. A higher temperature makes it possible to maintain good reaction efficiency while increasing the feed rates of the feed ducts.

Also advantageously, it is possible to adjust the content of the fluorine or chlorine compound (preferably a fluorine compound) in the carrier gas as a function of the mean size of the natural or synthetic silica grains. Smaller grains make it possible to maintain good reaction efficiency with a carrier gas that is less rich in the fluorine or chlorine compound (preferably a fluorine compound).

By eliminating alkaline elements from the deposit of natural or synthetic silica, it is possible to build up the optical fiber silica preform using a starting material that is much less expensive, particularly when natural silica is used, than very high purity synthetic silica, which is five to ten times more expensive. The extra cost due to the chemical treatment remains small in proportion. The quality of optical transmission provided by the fiber obtained from the preform built up with natural or synthetic silica that has been treated by a fluorine or chlorine compound (preferably with a fluorine compound) is comparable with that of a fiber obtained by building up using very high purity synthetic silica, and is better than that of a fiber obtained from a preform that has been built up with natural or synthetic silica but not treated with a fluorine or chlorine compound.

Other characteristics and advantages of the invention will appear on reading the following description of FIGS. 1 and 2.

FIG. 1 shows diagrammatically the items implemented when applying the method of purifying natural or synthetic silica during deposition of an optical fiber preform, in the case of external injection of the reagents into the plasma flame envelope at the torch outlet.

FIG. 2 is a diagram showing the items implemented in application of the method of purifying natural or synthetic silica to deposition on an optical fiber preform in the case of internal injection of the reagents, upstream of the plasma flame envelope.

The method of purifying natural or synthetic silica makes it possible to deposit one or more layers of natural or synthetic silica on an optical fiber preform that contain only negligible amounts of alkali elements such as sodium or lithium, or of alkaline-earth elements. The deposition operation, also known as a building-up operation, serves to increase the diameter of a preform, to enable a continuous fiber to be drawn therefrom that is several tens of kilometers long.

In FIG. 1, the method comprises a plasma torch 3 which constitutes the means of supplying heat energy, including electrical inductor components 5. A preform 1 in the form of a cylinder extends in a longitudinal direction L and is caused to rotate about its axis as indicated by arrow 7. The plasma torch 3 moves back and forth substantially parallel to the longitudinal direction L of the preform. The preform is rotated by a glassmaker's lathe (not shown). The chucks of the lathe drive two glass rods which are welded to the two ends of the preform. The lathe is placed in an enclosed box that provides protection against electromagnetic radiation and against gaseous discharges from the chemical reaction.

A feed duct 9 delivers grains of natural or synthetic silica 11 to the plasma. These grains are the result, for example, of grinding up coarse blocks of natural quartz or rock crystal. The feed is performed merely by gravity.

The feed duct 9 receives a feed duct 13 that feeds the plasma with a gas 15 that conveys a given content of a fluorine or chlorine compound, preferably of a fluorine compound, in addition to the grains 11. As depicted in FIG. 1, feed duct (13) intersects the wall of feed duct (9). The feed duct is external to the plasma torch 3, conveying the reagents into the flame envelope of the plasma at the torch outlet. The carrier gas is preferably air. The fluorine compound is, for example, sulfur hexafluoride $SF_6$, or a Freon generally selected from those authorized under European regulations, such as $C_2F_6$. The chlorine compound may be chlorine gas $Cl_2$, for example. A valve connected to a gas supply placed outside the box serves to adjust the carrier gas flowrate. Another valve connected to the gas supply serves to adjust the content of fluorine or chlorine compound in the carrier gas. The carrier gas may be constituted solely by the fluorine or chlorine compound, preferably a fluorine compound, in the pure state. A valve (not shown) is placed outside the box to allow the feed rate of the grains 11 to be adjusted.

The plasma is the seat of a chemical reaction between the natural synthetic silica grains and the fluorine or chlorine, preferably fluorine compound. The temperature of the plasma lies in the range 5,000° C. to 10,000° C., causing the natural or synthetic silica grains to melt. The fluorine or chlorine compounds react with the alkali elements such as sodium or lithium that are present in the natural or synthetic silica, causing the fluorides NaF or LiF or the chlorides NaCl or LiCl to be given off in gaseous form.

Good reaction efficiency is obtained under the following operating conditions:

| | |
|---|---|
| plasma power | 40 kW to 100 kW |
| natural or synthetic silica flowrate | 0.2 kg/h to 5 kg/h |
| average grain size | 50 μm to 600 μm |
| carrier gas flowrate | 0 to 15 liters/min |
| fluorine compound content in carrier gas | 0.3% to 100% |

In the above example, the choice of a plasma torch does not restrict the generality of the method which can also be implemented by any other means for delivering heat energy and creating a temperature greater than 1,000° C., and in particular by means of a flame from a combustion device.

FIG. 2 is similar to FIG. 1 except that the supply of grains 11 and gas 15 is internal to the plasma torch 3, conveying the reagents upstream of the plasma flame envelope.

What is claimed is:

1. A method of depositing natural or synthetic silica on an optical fiber preform, in which a substantially cylindrical preform (1) extending in a longitudinal direction (L) is set into rotation (7) about its axis in front of a plasma or flame (4) coming from a heat energy supply source (3) which moves back and forth substantially parallel to the longitudinal direction (L) of the preform (1), and in which a feed duct (9) feeds the plasma or the flame with grains of natural or synthetic silica (11), characterized in that the same feed duct (9) feeds the plasma or flame with a fluorine or chlorine compound mixed with a carrier gas (15), wherein the flourine or chlorine compound is combined with the grains of natural or synthetic silica in the feed duct by means of an additional feed duct intersecting the wall of feed duct (9) prior to the flourine or chlorine compound and the grains of natural or synthetic silica exiting the feed duct (9), the feed conditions of said duct (9) being adjusted to cause alkali or alkaline-earth elements contained in the grains (11) of natural or synthetic silica to react with the fluorine or the chlorine of the fluorine or chlorine compound.

2. The method claimed in claim 1 characterized in that the fluorine or chlorine compound is a fluorine compound.

3. The method claimed in claim 1 wherein said duct (9) is external to the heat energy supply source (3).

4. The method claimed in claim 1 wherein said duct (9) is internal to the heat energy supply source (3).

5. The method claimed in claim 1 wherein the heat energy supply source (3) are adapted to create a temperature greater than 1000° C.

6. The method according to claim 1, wherein only the plasma comes from the heat energy supply source.

7. The method according to claim 1, wherein the grains of natural or synthetic silica fed by the feed duct have an average grain size of 50 μm to 600 μm.

8. The method according to claim 1, wherein fluorides or chlorides are given off in gaseous form.

* * * * *